United States Patent
Jeon

(10) Patent No.: US 8,682,518 B2
(45) Date of Patent: Mar. 25, 2014

(54) SHIFT CONTROL SYSTEM AND SHIFT CONTROL METHOD FOR HYBRID VEHICLE

(75) Inventor: Byeong Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 577 days.

(21) Appl. No.: 12/948,604

(22) Filed: Nov. 17, 2010

(65) Prior Publication Data

US 2012/0053767 A1   Mar. 1, 2012

(30) Foreign Application Priority Data

Aug. 31, 2010  (KR) .................. 10-2010-0085145

(51) Int. Cl.
| | |
|---|---|
| *G06F 7/00* | (2006.01) |
| *G06F 17/00* | (2006.01) |
| *B60L 9/00* | (2006.01) |
| *B60L 11/00* | (2006.01) |
| *G05D 1/00* | (2006.01) |
| *G05D 3/00* | (2006.01) |

(52) U.S. Cl.
USPC ......................................................... 701/22

(58) Field of Classification Search
USPC ......................................................... 701/22
See application file for complete search history.

(56) References Cited

U.S. PATENT DOCUMENTS

| 4,263,826 A * | 4/1981 | Hartz et al. ................ 477/30 |
| 2007/0102211 A1* | 5/2007 | Nozaki et al. .............. 180/65.7 |
| 2007/0111852 A1* | 5/2007 | Yatabe et al. ............... 477/107 |
| 2011/0312468 A1* | 12/2011 | Ito et al. .................... 477/15 |
| 2012/0089290 A1* | 4/2012 | Kato et al. .................. 701/22 |

FOREIGN PATENT DOCUMENTS

| JP | 2007-131071 A | 5/2007 |
| JP | 2008-179242 A | 8/2008 |

* cited by examiner

*Primary Examiner* — Khoi Tran
*Assistant Examiner* — Harry Oh
(74) *Attorney, Agent, or Firm* — Morgan, Lewis & Bockius LLP

(57) ABSTRACT

A shift control system for a hybrid vehicle having an engine and a motor as power sources, may include a driving condition detector which detects whether a kick-down shift-request occurs, and a hybrid control unit which determines a motor rotation speed of a target shift-speed when the kick-down shift-request may be detected, determines whether the motor rotation speed satisfies a required torque, and executes a kick-down shift in EV (ElectircVehicle) mode or in HEV (Hybrid Electric Vehicle) mode according to a condition that the motor rotation speed satisfies the required torque or not.

5 Claims, 5 Drawing Sheets

SHIFT CONTROL SYSTEM AND SHIFT CONTROL METHOD FOR HYBRID VEHICLE

CROSS-REFERENCE TO RELATED APPLICATION

The present application claims priority to Korean Patent Application No. 10-2010-0085145 filed in the Korean Intellectual Property Office on Aug. 31, 2010, the entire contents of which is incorporated herein for all purposes by this reference.

BACKGROUND OF THE INVENTION

1. Field of the Invention

The present invention relates to a hybrid vehicle. More particularly, the present invention relates to a shift control system and a shift control method for a hybrid vehicle which provides an active kick-down shift according to operations of an engine in EV mode.

2. Description of Related Art

Because of demands for enhancement of fuel efficiency and reinforcement of exhaust gas regulations, eco-friendly vehicles have been researched. A hybrid vehicle is one type of such eco-friendly vehicles and attracts public attention.

The hybrid vehicle uses an engine and a motor as power sources, and enhances energy efficiency and reduces exhaust gas by selectively using the engine and the motor as the power sources. In order to minimize cost and torque loss, an engine clutch operated by fluid, instead of a torque converter, is mounted between the engine and the motor in the hybrid vehicle.

The engine clutch mounted in the hybrid vehicle connects or disconnects the engine and the motor according to a driving condition such that torque transmitted to the transmission is optimized.

Driving modes of the hybrid vehicle is divided into engine mode, driving by an engine, EV (Electric Vehicle) mode, driving by a motor, and HEV (Hybrid Electric Vehicle) mode, driving by an engine and a motor simultaneously.

Thus, how to harmonize power sources of the engine and the motor leads to enhancement of fuel efficiency.

In the conventional art, when a kick-down shift-request occurs for quick acceleration in the EV mode, a hybrid control unit (HCU) executes a kick-down shift during operation of a motor.

However, as shown in FIG. 4, since the more rotation speed of a motor is increased, the more torque is reduced, even if gear ratio is increase with a kick-down shift, sufficient acceleration may not be realized.

That is, motor rotation speed is increased with the kick-down shift but acceleration may be deteriorated and un-synchronized acceleration may happen.

In the conventional art, to solve the above problem, as shown in FIG. 5, when a kick-down shift from i shift to i-n shift is requested in the EV mode, a kick-down shift is prohibited and an engine is started using ISG (Idle Stop and Go).

After the engine start is completed, an engine clutch is engaged, and a kick-down shift of HEV mode is executed from the moment of power transmission of the engine.

However, above method also generates excessive acceleration dead zone time, which starts from the moment a kick-down shift is required to the moment the engine starts and the engine clutch is completely engaged, that is, real power transmission is too delayed.

Consequently, the conventional method may not improve acceleration response of a kick-down shift in EV mode of a hybrid vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shift control system and a shift control method for a hybrid vehicle which provides an active kick-down shift according to operations of an engine in EV mode.

In an aspect of the present invention, the shift control system for a hybrid vehicle having an engine and a motor as power sources, may include a driving condition detector which detects whether a kick-down shift-request occurs, and a hybrid control unit which may determine a motor rotation speed of a target shift-speed when the kick-down shift-request may be detected, may determine whether the motor rotation speed satisfies a required torque, and executes a kick-down shift in EV (ElectricVehicle) mode or in HEV (Hybrid Electric Vehicle) mode according to a condition that the motor rotation speed satisfies the required torque or not.

The hybrid control unit may determine the motor rotation speed of the target shift-speed by multiplying an output rotation speed of a transmission by a gear ratio of the target shift-speed.

The hybrid control unit may execute the kick-down shift in the EV mode when the motor rotation speed of the target shift-speed may be less than a standard rotation speed so that the required torque may be satisfied, and changes a driving mode to the HEV mode by engaging an engine clutch.

The hybrid control unit may control an engine to start when the motor rotation speed of the target shift-speed may be more than a standard rotation speed so that the required torque may be not satisfied, changes a driving mode to the HEV mode by engaging an engine clutch, and then executes the kick-down shift in the HEV mode, wherein when the hybrid control unit may determine that the motor rotation speed of the target shift-speed may be more than the standard rotation speed, the hybrid control unit prohibits the kick-down shift for a predetermined time period.

In another aspect of the present invention, the shift control method for a hybrid vehicle may include detecting whether a kick-down shift-request occurs in EV (ElectircVehicle) mode, determining motor rotation speed of a target shift-speed when the kick-down shift-request may be detected, and determining whether the motor rotation speed satisfies a required torque, and executing the kick-down shift in the EV mode or in HEV (Hybrid Electric Vehicle) mode according to a condition that the motor rotation speed satisfies the required torque or not.

The shift control method may further may include executing the kick-down shift in the EV mode when the motor rotation speed of the target shift-speed may be less than a standard rotation speed so that the required torque may be satisfied, and changing a driving mode to the HEV mode by engaging an engine clutch.

The shift control method may further may include controlling an engine to start when the motor rotation speed of the target shift-speed may be more than a standard rotation speed so that the required torque may be not satisfied, changing a driving mode to the HEV mode by engaging an engine clutch, and executing the kick-down shift in the HEV mode.

The shift control method may further may include prohibiting the kick-down shift for a predetermined time period when it may be determined that the motor rotation speed of the target shift-speed may be more than the standard rotation speed.

A hybrid vehicle provided with the shift control system according to the exemplary embodiment of the present invention may realize rapid acceleration in the kick-down shift of EV mode.

And also, the hybrid vehicle provided with the shift control system according to the exemplary embodiment of the present invention may provide the kick-down shift of HEV mode when motor torque is not sufficient.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
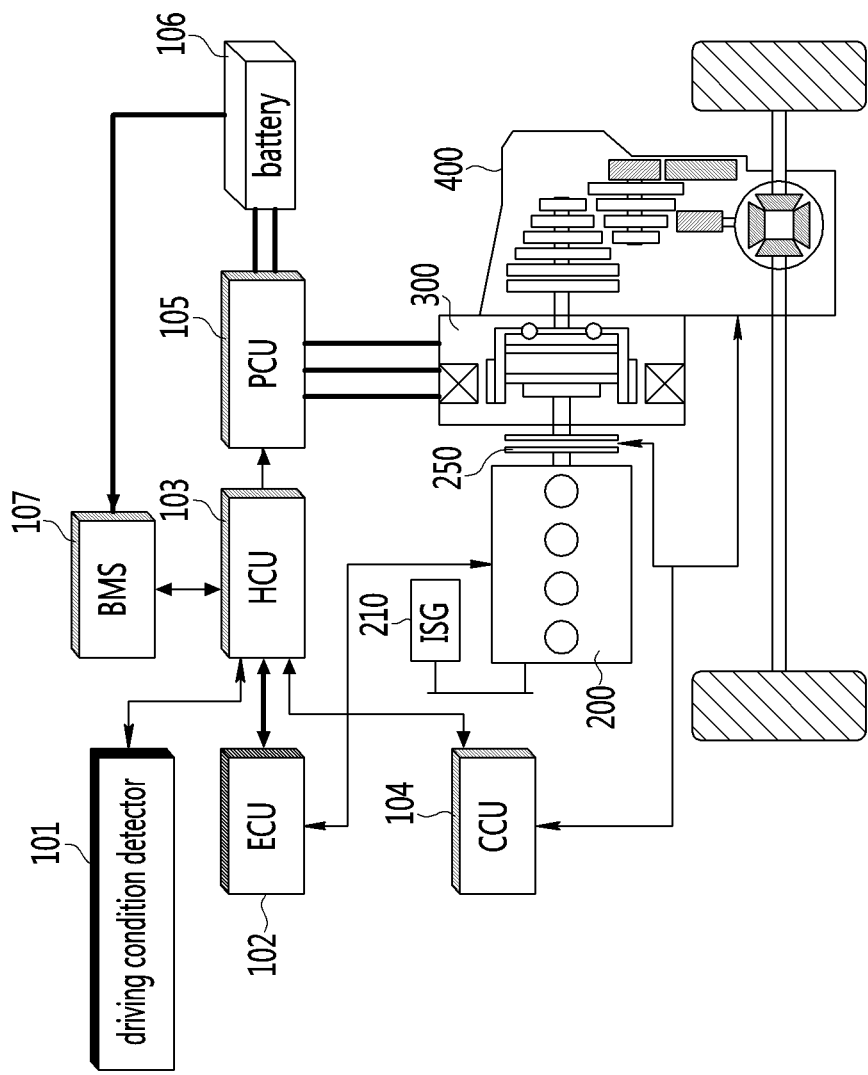
FIG. 1 is a drawing showing a shift control system for a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, referring to the drawings, exemplary embodiments of the present invention will be described in detail.

FIG. 1 is a drawing showing a shift control system for a hybrid vehicle according to an exemplary embodiment of the present invention.

Referring to FIG. 1, a shift control system for a hybrid vehicle according to an exemplary embodiment of the present invention includes a driving condition detector 101, an ECU (Engine Control Unit: 102), a HCU (Hybrid Control Unit: 103), a CCU (Clutch Control Unit: 104), a PCU (Power Control Unit: 105), a battery 106, a BMS (Battery Management System: 107), an engine 200, an engine clutch 250, a motor 300, and a transmission 400.

The driving condition detector 101 detects information of a deceleration request, an acceleration request or a kick-down shift and transmits the information to the HCU 103.

The driving condition detector 101 includes a brake pedal sensor, which detects operation of a brake pedal, and an APS (Accelerator Pedal Sensor), which detects operation of an acceleration pedal.

The ECU 102 is connected to the HCU 103 through a network and cooperates with the HCU 103 for controlling an operation of the engine 200.

The HCU 103, is the uppermost controller, controls all the operation of the hybrid vehicle by controlling lower controllers connected thereto through the network, and gathers and analyzes information of the lower controllers.

The HCU 103 calculates motor rotation speed of a target shift-speed when the kick-down shift-request is detected using gear ratio of the target shift-speed, executes the kick-down shift in the EV mode if the motor rotation speed of the target shift-speed is less than standard rotation speed so that the required torque is satisfied, and changes driving mode to the HEV mode by engaging the engine clutch 250, and thus stable acceleration may be achieved.

The required torque means output torque which provides acceleration responsiveness corresponding to the kick-down shift.

The HCU 103 calculates motor rotation speed of a target shift-speed when the kick-down shift-request is detected using gear ratio of the target shift-speed, controls the engine 200 to start if the motor rotation speed of the target shift-speed is more than standard rotation speed so that the required torque is not satisfied, changes driving mode to the HEV mode by engaging the engine clutch 250, and then executes the kick-down shift in the HEV mode, and thus stable acceleration may be achieved.

The CCU 104 controls actuators mounted in the transmission 400 according to the control of the HCU 20 so as to control a shift to a target shift-speed, engages or disengages the engine clutch 250 by controlling hydraulic pressure supplied to the engine clutch 250, and controls power delivery of the engine 200.

The PCU 105 includes a motor control unit (MCU), an inverter provided with a plurality of electric switching elements and protection circuit. The PCU 105 converts DC voltage supplied from the battery 106 into 3-phase AC voltage according to a control signal transmitted from the HCU 104 and drives the motor 300.

An insulated gate bipolar transistor (IGBT), a MOSFET, a transistor can be used as the electric switching element.

The protection circuit provided to the PCU 105 monitors the current flowing. If the overcurrent flows or the overvoltage is applied to the PCU 107 and the battery 108, the protection circuit disconnects the battery so as protect all the systems in the hybrid vehicle and passengers.

The battery 106 supplies the voltage to the motor 300 assisting output of the engine 200 in the HEV mode, and is recharged by the voltage generated in the motor 300.

The battery 106 supplies the power to the motor 300 in EV mode, and is recharged thorough the regenerative braking.

The BMS 107 detects information about a voltage, a current, and a temperature of a battery 106, controls a state of charge (SOC), a recharge current, and discharge current.

The engine 200 is controlled by the control of the ECU 102 to drive optimally.

The ISG 210 idle stops or starts the engine 200 according to a driving condition of the vehicle.

The engine clutch 250 is disposed between the engine 200 and the motor 300 and connects or disconnects the engine 200 and the motor 300 according to the drive mode (e.g., the engine mode, the hybrid mode, and the electric mode) by control of the CCU 104.

The motor 300 is driven by the 3-phase AC voltage according to the control of the PCU 105 so as to assist the output torque of the engine 200, and operates as the generator in a case that output of the engine 200 is excessive or the vehicle brakes.

The transmission 400 adjusts the shift-speed (or the speed ratio) according to the control of the CCU 104 and transmits the output torque to a driving wheel by selectively summing up torques of the engine 200 and the motor 300 according to the drive mode so as to run the vehicle.

A conventional automatic transmission or CVT may be used as the transmission 400.

Operation of the hybrid vehicle according to the present exemplary embodiment is the same as or similar to that of a conventional hybrid vehicle, and thus a detailed description will be omitted.

The kick-down shift in EV mode will be described in detail in this specification.

Figure 2:
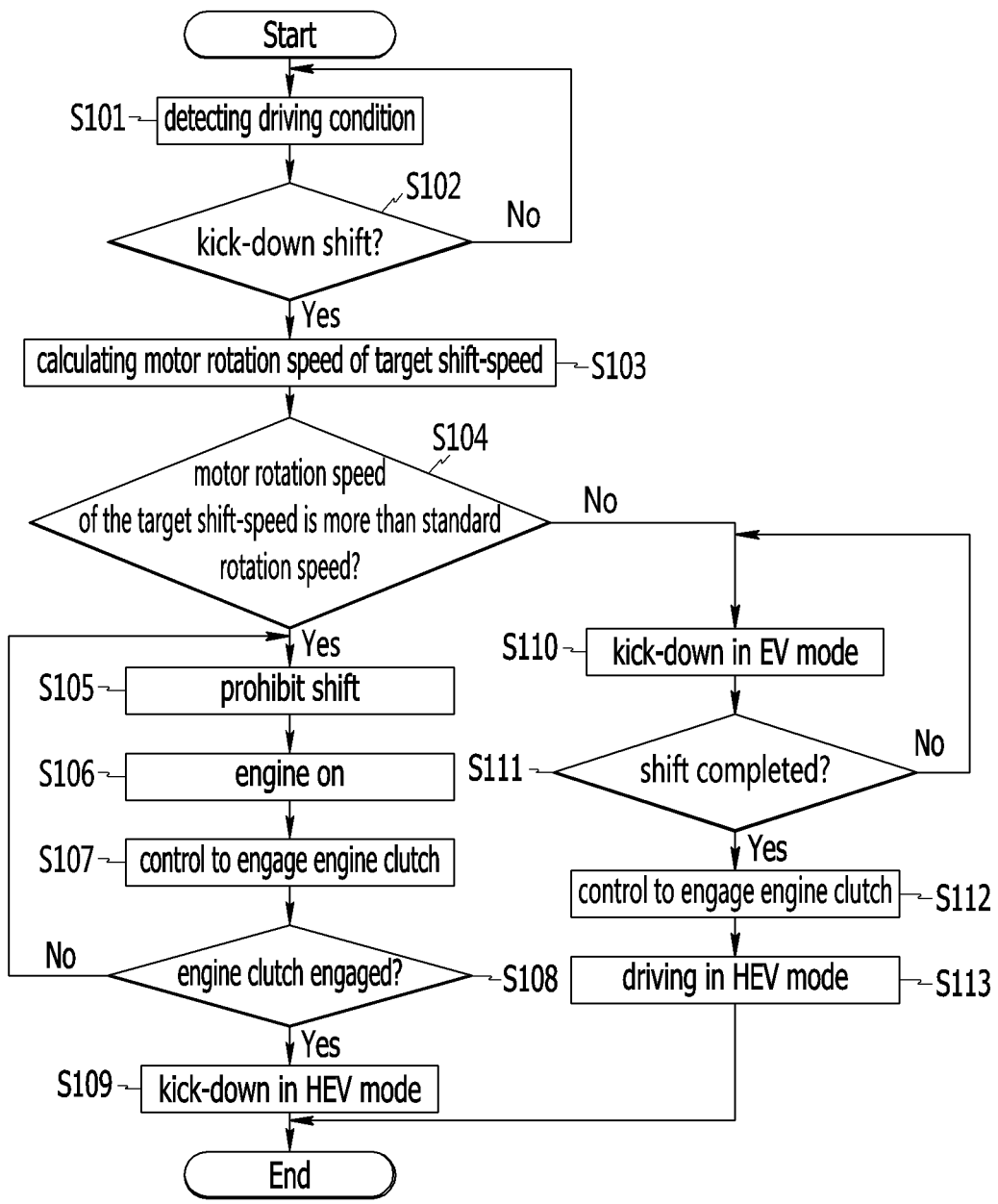
FIG. 2 is a flowchart of a shift control method for a hybrid vehicle according to an exemplary embodiment of the present invention.

FIG. 2 is a flowchart of a shift control method for a hybrid vehicle according to an exemplary embodiment of the present invention.

The driving condition detector 101 detects driving information in the EV mode and transmits the information to the HCU 103, the uppermost controller (S101).

The HCU 103 analysis the information from the driving condition detector 101, and determines whether a kick-down shift-request occurs (S102).

If it is determined that the kick-down shift-request does not occur in the step S102, it is returned to the step S101, and if it is determined that the kick-down shift-request occurs in the step S102, motor rotation speed of a target shift-speed is calculated using gear ratio of the target shift-speed (S103).

The motor rotation speed of a target shift-speed can be obtained as follows.

$N$(motor rotation speed of a target shift-speed)=No (transmission output rotation speed)×$R$(gear ratio of a target shift-speed)

And then, it is determined that the motor rotation speed of the target shift-speed calculated in the step S103 is more than standard rotation speed, which determines that the required torque is satisfied (S104).

If it is determined that the motor rotation speed of the target shift-speed is more than standard rotation speed, it is determined that the required torque is not satisfied when kick-down shift is executed in the EV mode, and thus the kick-down shift temporarily prohibited (S105).

And then, it is determined whether the engine 200 is operated or not, and the ISG 210 is controlled to start the engine 200 (S106) when the engine 200 is not operated, and then the engine clutch 250 is engaged by control of the CCU 104 (S107).

When engagement of the engine clutch 250 is completed and driving mode is changed from the EV mode to the HEV mode (S108), the CCU 104 controls the actuators mounted in the transmission 400 according to the control of the HCU 20 so as to control the shift to the target shift-speed, and thus stable acceleration may be achieved (S109).

Figure 3:
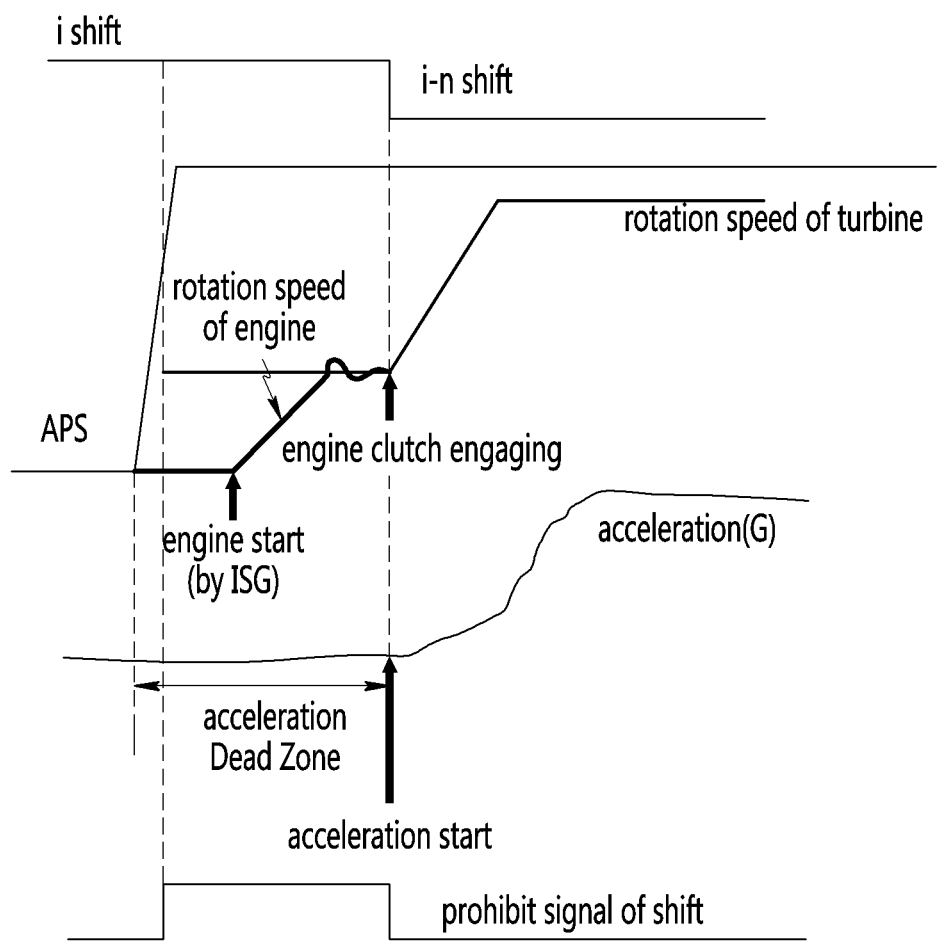
FIG. 3 is a graph showing a shift control method for a hybrid vehicle according to an exemplary embodiment of the present invention.
Figure 4:
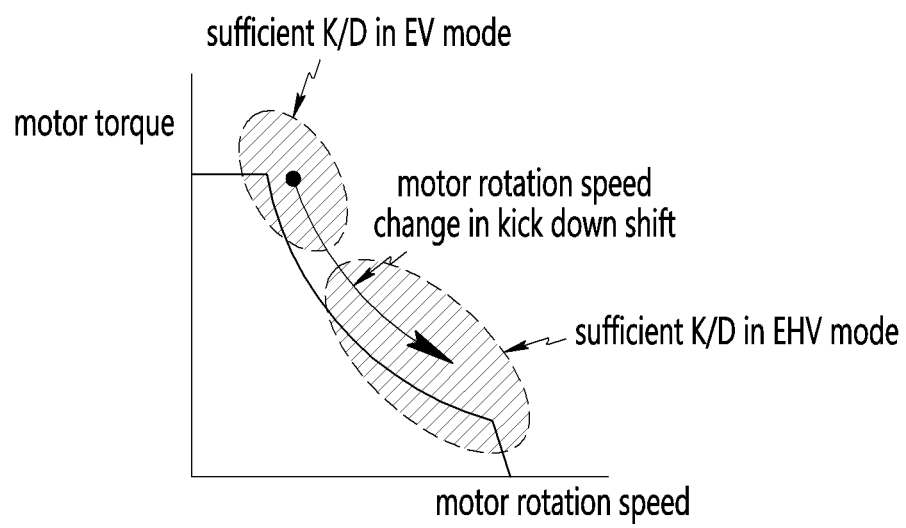
FIG. 4 is a graph showing torque characteristic of a motor of a hybrid vehicle.
Figure 5:
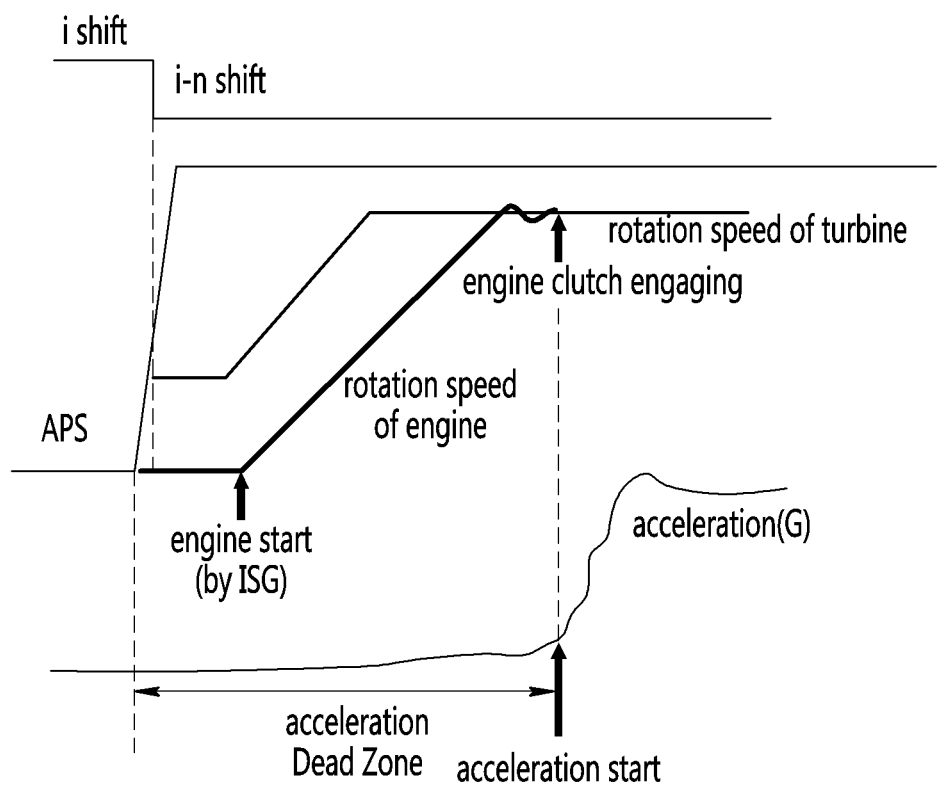
FIG. 5 is a graph showing a shift control method for a hybrid vehicle according to a conventional art.

As shown in FIG. 3, when a kick-down shift from i shift to i-n shift is requested in the EV mode according to rapid change of the APS, and the calculated motor rotation speed of the target shift-speed is more than the standard rotation speed so that the required torque is not satisfied, the kick-down shift temporarily prohibited and then the ISG 210 is controlled to start the engine 200. And the engine clutch 250 is engaged for gaining first acceleration response and secondary acceleration response may be obtained after the kick-down shift, and thus rapid and stable acceleration may be achieved.

In the step S104, if it is determined that the calculated motor rotation speed of the target shift-speed is less than the standard rotation speed, it is determined that the required torque is satisfied even if the kick-down shift is executed in the EV mode. The CCU 104 controls the actuators mounted in the transmission 400 according to the control of the HCU 20 so as to execute the kick-down shift in the EV mode (S110).

And then, after the kick-down shift is completed (S111), it is determined that whether the engine 200 is operated. And when the engine is not operated, the ISG 210 is controlled to start the engine 200 and the engine clutch 250 is engaged by control of the CCU 104 (S112), and thus rapid and stable acceleration may be achieved (S113).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control system for a hybrid vehicle having an engine and a motor as power sources, the system comprising:
   a driving condition detector which detects whether a kick-down shift-request occurs; and
   a hybrid control unit which determines a motor rotation speed of a target shift-speed when the kick-down shift-request is detected, determines whether the motor rotation speed satisfies a required torque, and executes a kick-down shift in EV (Electric Vehicle) mode or in HEV (Hybrid Electric Vehicle) mode according to a condition that the motor rotation speed satisfies the required torque or not;
   wherein the hybrid control unit executes the kick-down shift in the EV mode when the motor rotation speed of the target shift-speed is less than a standard rotation speed so that the required torque is satisfied, and then changes a driving mode to the HEV mode by engaging an engine clutch; and
   wherein the hybrid control unit controls an engine to start when the motor rotation speed of the target shift-speed is more than the standard rotation speed so that the required torque is not satisfied, then changes a driving mode to the HEV mode by engaging an engine clutch, and then executes the kick-down shift in the HEV mode.

2. The system of claim 1, wherein the hybrid control unit determines the motor rotation speed of the target shift-speed by multiplying an output rotation speed of a transmission by a gear ratio of the target shift-speed.

3. The system of claim 1, wherein when the hybrid control unit determines that the motor rotation speed of the target shift-speed is more than the standard rotation speed, the hybrid control unit prohibits the kick-down shift for a predetermined time period.

4. A shift control method for a hybrid vehicle comprising:
   detecting whether a kick-down shift-request occurs in EV (ElectircVehicle) mode;
   determining motor rotation speed of a target shift-speed when the kick-down shift-request is detected; and
   determining whether the motor rotation speed satisfies a required torque, and executing the kick-down shift in the EV mode or in HEV (Hybrid Electric Vehicle) mode according to a condition that the motor rotation speed satisfies the required torque or not;
   executing the kick-down shift in the EV mode when the motor rotation speed of the target shift-speed is less than a standard rotation speed so that the required torque is satisfied, and changing a driving mode to the HEV mode by engaging an engine clutch; and
   controlling an engine to start when the motor rotation speed of the target shift-speed is more than the standard rotation speed so that the required torque is not satisfied, then changing a driving mode to the HEV mode by engaging an engine clutch, and then executing the kick-down shift in the HEV mode.

5. The shift control method of claim 4, further comprising:
   prohibiting the kick-down shift for a predetermined time period when it is determined that the motor rotation speed of the target shift-speed is more than the standard rotation speed.

* * * * *